United States Patent Office 2,988,498
Patented June 13, 1961

2,988,498
PROCESSES FOR PRODUCING ALUMINA CONTAINING MATERIALS
George R. Gilbert, Elizabeth, N.J., assignor to Esso Research and Engineering Company, a corporation of Delaware
No Drawing. Filed Jan. 4, 1956, Ser. No. 557,421
6 Claims. (Cl. 208—138)

This invention relates to a process for the preparation of contact or catalytic substances comprising metal oxide gels and methods of treating hydrocarbons, such as, hydroforming, catalytic cracking etc., using such catalysts or contacting agents.

According to the present invention there is provided an improved economical and practical process for the preparation of metal oxide gels such as alumina gel, zinc oxide gel, chromium oxide gel, manganese gel and gels of metal alloys such as zinc-aluminum alloy, aluminum-chromium alloy, aluminum-manganese alloy and the like, or alumina or other metal oxide containing catalysts or contacting agents by hydrolyzing a metal phenolate or cresylate, such as aluminum or zinc phenolate or cresylate or the like and recovering the phenol or cresol for reuse in the preparation of additional amounts of aluminum, zinc or the like, phenolate or cresylate. The materials prepared according to the present process are characterized by high surface area and by high purity eliminating any necessity for removing harmful ions.

According to the present invention a phenol or phenol containing material in substantially anhydrous form is reacted with a metal such as aluminum, magnesium, zinc, titanium, calcium, chromium, manganese or alloys thereof to form a metal phenolate, cresylate or the like. Mixtures of phenols may be used. A small amount of catalyst is preferably used to promote the reaction.

As the phenols are sparingly water soluble they are regenerated when the phenolate or cresylate is hydrolyzed and may be recovered and reused in the process. The regenerated phenols contain some dissolved water and are freed of this water by a dewatering step such as heating or distillation to remove the water and to make a substantially anhydrous phenol. During hydrolysis a water slurry of the hydrous metal oxide is obtained.

To produce an alumina or zinc oxide gel, the slurry of the hydrous metal oxide is dried and activated at an elevated temperature. Or the slurry of metal oxide may be treated with impregnating solutions of catalytic materials before drying, such solutions as ammonium molybdate, chromic acid etc. being used.

Petroleum naphtha and similar hydrocarbon mixtures containing appreciable quantities of naphthenes can be subjected to a reforming operation to yield a liquid product of improved octane number boiling within the gasoline range. Depending upon reaction conditions, catalytic reforming operations are generally referred to as either hydroforming or aromatization reactions. By hydroforming is ordinarily meant an operation conducted at elevated temperatures and pressures in the presence of a solid catalyst and added hydrogen wherein a hydrocarbon fraction is increased in aromaticity and wherein there is no net consumption of hydrogen. The term aromatization refers to an operation in which a hydrocarbon or hydrocarbon fraction is treated at elevated temperatures but at substantially atmospheric pressure in the presence of a solid catalyst for the purpose of increasing the aromaticity of the hydrocarbon or hydrocarbon fraction.

Catalytic reforming operations are usually carried out at temperatures of around 850° to 1100° F. in the presence of such catalysts as molybdenum oxide, chromium oxide and the like. These catalysts are usually supported on a base or carrier, the most commonly used base being alumina. In this invention, alumina based catalysts consisting of one or more of the group VI oxides such as molybdenum oxide or chromium oxide, platinum or palladium supported on alumina have been prepared and used as reforming catalysts. About 0.1 to about 5% platinum on alumina may be used.

In addition to the reforming processes, high boiling hydrocarbon materials may be converted to low boiling hydrocarbon materials by a process of catalytic cracking carried out by subjecting the high boiling hydrocarbon material to cracking conditions of temperature and pressure for a sufficient time in the presence of catalysts such as alumina, alumina-boria, silica-alumina, alumina-silica-magnesia and the like. The catalyst may be in the form of fixed or moving bed with the vaporized high boiling hydrocarbon material passing therethrough or the so-called fluid technique may be used in which the finely divided catalyst material is suspended in vapors of high boiling hydrocarbon material during the reaction. Other catalytic conversions of hydrocarbons or other compounds may be practiced using catalysts prepared according to the present process.

When making alumina gel, aluminum metal in the form of chips, shot, turnings, ingots or the like is reacted with a substantially anhydrous phenol. A small amount of catalytic material such as mercuric chloride, mercury salts, iodine, aluminum halide, etc. may be used but the mercuric chloride is preferred. The catalytic material may be added with the metal or may be separately added. When using mercuric chloride about 0.01 to 1.0 part by weight of mercuric chloride per part of aluminum by weight is used, preferably about 0.1 part by weight of mercuric chloride. The reaction may be carried out at atmospheric pressure or superatmospheric pressure.

When reacting a phenol and aluminum alone in the absence of any anhydrous liquid diluent, it is necessary to heat the reaction mixture to about 350° to 400° F., preferably about 356° F. for phenol and about 374° F. for cresol to initiate the reaction between the aluminum metal and the phenol containing material. During the reaction the mixture is maintained at a temperature of about 350° F. to 400° F. The aluminum metal and phenol form an aluminum phenolate and hydrogen which is substantially pure hydrogen and may be recovered as such. Vapors passing overhead from the reaction mixture may be cooled and the condensed liquid and hydrogen gas recovered. However, when using an organic diluent such as a hydrocarbon distillate oil boiling between about 300° and 400° F., the reaction temperature is reduced to between about 280° and 300° F. when using phenol. The amount of diluent may vary between about 0.5 to 1 (hydrocarbon to phenol) by volume and 5 to 1 (hydrocarbon to phenol) by volume.

The products of reaction comprising a solution of aluminum phenolate or cresylate in phenol or cresol may be hydrolyzed in the reaction zone or passed to a suitable hydrolysis zone which may be an orifice mixer, a centrifugal pump or the like. Introduced into the hydrolysis step is water or steam to hydrolyze the phenolate or cresylate forming a slurry of hydrous almumina and regenerating phenol or cresol. The temperature during hydrolysis may be between about 35° and 400° F.

In carrying out the reaction between the metal and the anhydrous phenol containing material in the absence of a hydrocarbon diluent, the mixture is heated to or near the boiling point of the phenol compound while refluxing the phenol compound in a still. When the reaction is complete, in one form of the invention, steam is passed through the mixture at a temperature of about 212° to 400° F. to hydrolyze the aluminum phenolate compound and leaving aluminum hydroxide in the still while removing water and a phenol containing compound overhead. In this form of the invention phenol is substantially completely removed from the aluminum hydroxide and is reused for making additional metal phenolate after being dried as by heating or distilling. The phenol or cresol is separated from the water in the vapors leaving the still, in any suitable way, as for example, by condensing, cooling, settling and separating the aqueous and phenol containing layers. The separated aqueous layer may then be saturated with $CO_2$-containing gas to recover the relatively small quantity of phenol or cresols dissolved in it.

Using a phenol with this form of the invention, the phenolates and cresylates of aluminum, zinc, chromium, manganese and of alloys such as aluminum-zinc, aluminum-chromium, aluminum-manganese and the like may be obtained. As an example for producing a zinc aluminate or spinel catalyst suitable for aromatizing reactions or hydroforming, a zinc-aluminum alloy comprising 54% of zinc by weight and 46% aluminum by weight was reacted with phenol. In a second example cresol was used instead of phenol.

*Example 1*

About 400 grams of the zinc-aluminum alloy in chip form were reacted with 2500 grams of phenol ($C_6H_5OH$) in a refluxing still using about 1 gm. of $HgCl_2$ as catalyst or promoter. The reactants were kept at the boiling point of the phenol at atmospheric pressure until practically all the metal was dissolved while refluxing the phenol. The reaction mixture was then hydrolyzed with about 10 liters of hot water and the precipitate was filtered and washed with distilled water. The washed precipitate comprising zinc and aluminum hydroxides was mulled for about 3 hours with about 190 grams of glacial acetic acid, diluted with 190 cc. of water. A 200 cc. ammoniacal solution containing about 4% $NH_3$ was used to dissolve 51.5 grams of ammonium molybdate. This solution was added to the mulled aluminum hydroxide and the resulting mixture thoroughly mixed or mulled. The product was dried at about 250° F., calcined at about 1200° F. for 3 hours and then pilled. The resulting catalyst contained about 40% by weight of ZnO, about 49% by weight of $Al_2O_3$ and about 11% by weight of $MoO_3$. About 280 cc. of catalyst in dried and calcined form were recovered in Example 1.

Another zinc aluminate catalyst was prepared using cresol instead of phenol as set forth in the next example.

*Example 2*

About 2500 cc. of U.S.P. cresol were reacted with about 400 grams of an alloy containing about 46% aluminum and about 54% zinc in a refluxing still using a trace of $HgCl_2$ as a promoter. The reactants were kept at atmospheric pressure at the boiling point of the cresol until the alloy went into solution while refluxing the cresol. The reaction mixture in the still was hydrolyzed with about 30 liters of distilled water. The resulting mixture was steam distilled to recover the cresol. The dry precipitate comprising zinc and aluminum hydroxides was mulled with an ammoniacal solution of ammonium molybdate prepared as above described in Example 1. The mixture was then dried at about 250° F., calcined at about 1200° F. for about 3 hours and then pilled. The composition of the catalyst was substantially the same as when using phenol in the above Example 1. About 180 cc. of dried and calcined catalyst were recovered in Example 2.

The catalysts prepared in Examples 1 and 2 were used as fixed beds in a hydroforming process in which the feedstock was 150°–250° F. East Texas virgin naphtha; 950° F. average catalyst temperature; the rate of feed was 1.2 liquid v./v./hr.; the $H_2$/hydrocarbon mol ratio was 2 to 1; the reaction period was 4 hours and the reactor was a 500 cc. volume reactor operating at about 50 pounds per square inch gauge.

The following results were obtained:

| Catalyst prepared from | Phenolate | Cresylate |
|---|---|---|
| Vol. of catalyst | 280 cc. | 180 cc. |
| Gasoline produced: | | |
| Octane No. OFR—Res | 89 | 86 |
| Yield, Vol. Percent | 86 | 88 |
| Gas, wt. percent | 8 | 7.6 |
| Carbon, wt. percent | 2.3 | 2.0 |

From the above data it will be seen that relatively high yields of high octane gasoline are obtained with catalysts prepared according to the present invention.

*Example 3*

To about 1318 grams of anhydrous phenol and about 930 grams of a hydrocarbon distillate oil having a boiling range of about 300° to 400° F. were added about 115 grams of aluminum metal pieces to react the aluminum and phenol. The ratio of hydrocarbon to phenol was 1 to 1 by volume. This particular hydrocarbon distillate contained about 50% by volume paraffins, about 20% of aromatics and the rest naphthenes. The mixture was heated to about 280°–300° F. in a refluxing still and the reaction was promoted by a trace of $HgCl_2$. After all of the aluminum metal had gone into solution, the contents of the still were dumped into 8 liters of water plus 800 cc. concentrated $NH_4OH$ (28% $NH_3$) for hydrolyzing the aluminum phenolate. A water slurry of alumina and regenerated phenol were obtained. Two layers were obtained with the lower layer being a blue colored aqueous slurry and the upper layer being the phenol-hydrocarbon layer.

The slurry was filtered off and the filter cake mixed with water. The mixture was heated to boiling to distil off the hydrocarbon distillate but heating was stopped before all the water was evaporated. The wet precipitate of aluminum hydroxide was then dried overnight at 250° F. and about 280 grams of aluminum hydroxide were obtained. X-ray analysis of the dried aluminum hydroxide showed the presence of sufficient beta aluminum trihydrate to produce 84% eta alumina after calcination at 1200° F. Then a small portion of the dried aluminum hydroxide was calcined for 3 hours at 1200° F. and after calcining the alumina had a surface area of 188 m.²/gram, a pore volume of 0.34 cc./gram and an average pore diameter of 72.5 Angstrom units.

The rest of the dried alumina was calcined at about 1100° F. for about 4 hours. About 175 grams of alumina were recovered. The alumina was pulverized and mixed with 124 cc. of distilled water solution containing 2.625 grams of chlorplatinic acid (40% Pt). The mixture was left standing overnight. Then the mixture was dried overnight at about 245°–250° F. Then the mixture was dried at about 400° F. for about 16 hours. The dried mixture was then pilled and calcined at about 1100° F. for about 1 hour. The catalyst contained about 0.6% platinum on alumina.

This catalyst was used for hydroforming a virgin naphtha having a boiling range between about 200° and 330° F. and having a 58 research octane number. The reactor was a fixed bed reactor maintained at about 920° F., the feed rate was about 4 w./hr./w. (weight of naphtha per hour per weight of catalyst). The cycles were 6 hour cycles. About 5000 cubic feet of hydrogen per barrel per hour were added to the reactor. The following data were obtained:

| Cycle No | 1 | 2 |
|---|---|---|
| Pressure, p.s.i.g | 200 | 200 |
| Research O.N | 92.8 | 93.6 |
| $C_5$–430° F., Vol. Percent | 88.0 | 87.5 |
| Gas ($C_4$ and lighter) Wt. Percent | 5.0 | 5.3 |

The carbon yield is very low and is below about 0.2% by weight. At about 400 p.s.i.g. the hydroformed naphtha has a research octane number of about 88.7 and a yield of about 90.0 volume percent.

The process according to this invention can also be used to prepare cracking catalysts of which the following are examples.

*Example 4*

Aluminum metal turnings (about 81 grams) were heated in a refluxing still with 1000 grams of anhydrous phenol, using 0.1 gram of $HgCl_2$ as a catalyst. The reactants were maintained at the boiling point of phenol, while refluxing the phenol. The product was hydrolyzed by pouring into and stirring with 10 liters of water. The $Al(OH)_3$ precipitate was filtered and washed free of phenol with distilled water. The washed precipitate was homogenized with washed silica hydrogel, dried and then calcined at 1000° F. for about 3 hours. The resulting material had the following composition, by weight, on a dry basis: 87% $SiO_2$–13% $Al_2O_3$. The yield was 94% on the materials used.

*Example 5*

A catalyst of approximately the same composition as given in Example 4 was made by hydrolyzing aluminum cresylate prepared by heating aluminum turnings with cresol at its boiling point, using $HgCl_2$ as a catalyst, with steam to precipitate aluminum hydroxide which was removed as lumps from the flask and washed. The washed precipitate was homogenized with washed silica hydrogel, dried and calcined at 1000° F. as in Example 4.

It is to be understood that my invention is not limited by the examples given above. Other variations will be evident to persons skilled in the art. For example, satisfactory cracking catalysts may also be made by combining aluminum hydroxide, made by hydrolysis of aluminum phenolate or cresylate with mixed sodium silicate-acid solutions, or with silica sols prepared in any manner; or by hydrolyzing an anhydrous aluminum phenolate or cresylate with a silica hydrosol prepared in the usual way or by the cation exchange resin method to remove water from the silica sol during the hydrolysis to form silica hydrogel. Or the aluminum phenolate or cresylate may be hydrolyzed in the presence of silicon alcoholate such as an alkyl silicate or with a silicon halide such as silicon tetrachloride.

Crude or impure phenols in dilute or concentrated mixtures or in solutions of hydrocarbons may be treated with aluminum or other metals to form a phenolate which is separated from the impurities and then hydrolyzed to recover substantially pure phenol and at the same time produce an adsorbent alumina as a by product. To recover a pure phenol from crude or impure mixtures thereof, the impure anhydrous mixture is treated with aluminum metal at a temperature at or near the boiling point of the phenol, preferably using $HgCl_2$ as a promoter to form aluminum phenolate. Instead of using aluminum, other metals such as zinc may be used.

The phenolate is separated from the rest of the hydrocarbon mixture by any suitable means, such as chilling below about 40° F. and then filtering, etc. The crystals of phenolate of aluminum are washed with a suitable solvent, such as light paraffins such as n-heptane, n-pentane or mixtures thereof or light hydrocarbon distillates. The washed crystals are then hydrolyzed with steam or water to regenerate the phenol and to precipitate an active adsorbent form of alumina as the hydroxide which is treated in a known manner, as by drying and calcining, to form alumina.

The by-product alumina obtained in this modification is valuable as an adsorbent and/or as a catalyst or catalyst base. During the reaction of metal and a phenol, hydrogen is evolved and part or all of this hydrogen may be used as such or may be used as a source of heat.

This application forms a continuation-in-part of my application Serial No. 250,198, filed October 6, 1951, now abandoned.

What is claimed is:

1. A method of producing alumina which comprises reacting aluminum metal with anhydrous phenol dissolved in about an equal volume of hydrocarbon distillate boiling between about 300° F. and 400° F. at a reaction temperature between about 280° F. and 300° F. to produce aluminum phenolate, hydrolyzing the aluminum phenolate with an aqueous solution to form a water slurry of alumina and phenol and hydrocarbon distillate, recovering the alumina and drying and calcining it to form alumina and recovering and drying the phenol and hydrocarbon distillate layer and using the mixture for reacting additional aluminum metal with phenol.

2. A method of producing alumina which comprises reacting aluminum metal with anhydrous phenol dissolved in about an equal volume of hydrocarbon distillate boiling between about 300° F. and 400° F. at a reaction temperature between about 280° F. and 300° F. to produce aluminum phenolate, hydrolyzing the aluminum phenolate with an aqueous ammoniacal solution to form a water slurry of alumina and phenol and hydrocarbon distillate, recovering the alumina and drying and calcining it to form alumina and recovering and drying the phenol and hydrocarbon distillate layer and using the mixture for reacting additional aluminum metal with phenol.

3. A method of producing a catalyst containing alumina which comprises reacting aluminum metal with anhydrous phenol dissolved in about an equal volume of hydrocarbon distillate boiling between about 300° F. and 400° F. at a reaction temperature between about 280° F. and 300° F. to produce aluminum phenolate, hydrolyzing the aluminum phenolate with an aqueous solution to form a water slurry of alumina, recovering the alumina and drying and calcining it to form alumina, mixing chlorplatinic acid with the calcined alumina and then drying and calcining the resulting mixture to produce a catalyst containing 0.1 to 5% platinum on alumina.

4. A method of producing a catalyst containing alumina which comprises reacting aluminum metal with anhydrous phenol dissolved in about an equal volume of hydrocarbon distillate boiling between about 300° F. and 400° F. at a reaction temperature between about 280° F. and 300° F. to produce aluminum phenolate, hydrolyzing the aluminum phenolate with an aqueous ammoniacal solution to form a water slurry of alumina, recovering the alumina and drying and calcining it to form alumina, mixing chlorplatinic acid with the calcined alumina and then drying and calcining the resulting mixture to produce a catalyst containing 0.1 to 5% platinum on alumina.

5. A method of hydroforming naphtha under hydroforming conditions at a temperature between about 850° F. and 1100° F. under superatmospheric pressure of at least about 200 p.s.i.g. and in the presence of a catalyst prepared by reacting aluminum metal with anhydrous phenol dissolved in about an equal volume of hydrocarbon distillate boiling between about 300° F. and 400° F. at a reaction temperature between about 280° F. and 300° F. to produce aluminum phenolate, hydrolyzing the aluminum phenolate with an aqueous solution to form a water slurry of alumina, recovering the alumina and drying and calcining it to form alumina, mixing chlorplatinic acid with the calcined alumina and then drying and calcining the resulting mixture to produce a catalyst containing 0.1 to 5% platinum on alumina.

6. A method of hydroforming naphtha under hydroforming conditions at a temperature between about 850° F. and 1100° F. under superatmospheric pressure of at least about 200 p.s.i.g. and in the presence of a catalyst prepared by reacting aluminum metal with anhydrous phenol dissolved in about an equal volume of hydrocarbon distillate boiling between about 300° F. and 400° F. at a reaction temperature between about 280° F. and 300° F. to produce aluminum phenolate, hydrolyzing the aluminum phenolate with an aqueous ammoniacal solution to form a water slurry of alumina, recovering the alumina and drying and calcining it to form alumina, mixing chlorplatinic acid with the calcined alumina and then drying and calcining the resulting mixture to produce a catalyst containing 0.1 to 5% platinum on alumina.

References Cited in the file of this patent

UNITED STATES PATENTS

| | | |
|---|---|---|
| 2,125,961 | Shoemaker et al. | Aug. 8, 1938 |
| 2,211,972 | Gardinier et al. | Aug. 20, 1940 |
| 2,292,205 | Denison et al. | Aug. 4, 1942 |
| 2,360,302 | Etzler et al. | Oct. 10, 1944 |
| 2,579,251 | Coates et al. | Dec. 18, 1951 |
| 2,582,254 | Hunter | Jan. 15, 1952 |
| 2,713,037 | Kimberlin | July 12, 1955 |
| 2,776,188 | Gilbert | Jan. 1, 1957 |